Figure 1:
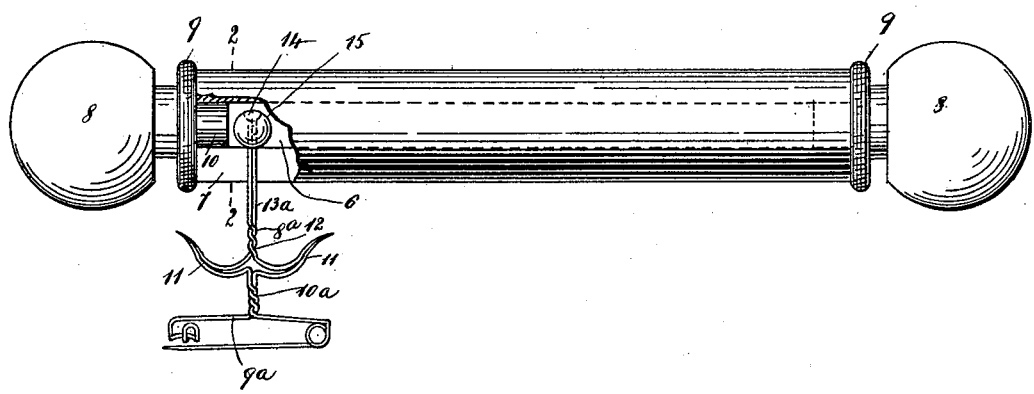

No. 645,542. Patented Mar. 20, 1900.
L. F. BERGMAN.
SUPPORT FOR CURTAINS.
(Application filed July 7, 1899.)

(No Model.)

WITNESSES:
John Ruckler,
F. A. Stewart

INVENTOR
Louis F. Bergman,
BY Edgar Tate & Co
ATTORNEYS

THE NORRIS PETERS CO., PHOTO-LITHO., WASHINGTON, D. C.

UNITED STATES PATENT OFFICE.

LOUIS F. BERGMAN, OF NEW YORK, N. Y.

SUPPORT FOR CURTAINS.

SPECIFICATION forming part of Letters Patent No. 645,542, dated March 20, 1900.

Application filed July 7, 1899. Serial No. 723,008. (No model.)

*To all whom it may concern:*

Be it known that I, LOUIS F. BERGMAN, a citizen of the United States, residing at New York, in the county of New York and State of New York, have invented certain new and useful Improvements in Supports for Curtains, of which the following is a full and complete specification, such as will enable those skilled in the art to which it appertains to make and use the same.

This invention relates to supports for curtains, and has more particular reference to supports of this class provided with adjustable securing devices.

The invention is fully disclosed in the following specification, of which the accompanying drawings form a part, in which like reference characters denote like parts in the several views, and in which—

Figure 2:
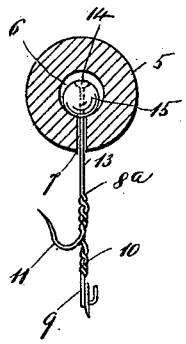
Figure 3:
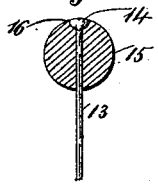

Figure 1 is a longitudinal view of a curtain-support constructed according to my invention; Fig. 2, a section thereof on the line 2 2, the securing devices being arranged in altered position; and Fig. 3, an enlarged detail sectional view of the fastening devices.

Referring more particularly to the drawings, I provide a curtain-pole 5, which is circular in cross-section and provided with a longitudinal central circular bore 6 and a longitudinal groove 7, communicating therewith. End knobs 8, provided with flanges 9, which engage the ends of the pole 5, are provided with pins 10, which fit the ends of the bore 6 and effectively close the same. I also provide securing devices which adjustably operate within the bore 6 and groove 7 and may thus be moved the entire length of the rod 5. These securing devices are constructed preferably of a single piece of twisted wire $8^a$ and provided with a spherical bearing 15, which operates within the bore 6. The outer ends of the wire are twisted to form a spring-clasp $9^a$ of the ordinary safety-pin type. Above the clasp 9 the wire is doubled upon itself and twisted together, as at $10^a$, above which twisted portion the two portions of the wire are again separated, each part being formed into a downwardly and outwardly directed hook 11. The two parts of the wire are again twisted together above these hooks, as at 12, and thence extend upwardly in straight parallel connection, as at 13, and at the point where they terminate in integral connection are provided with a knob or head 14. Mounted upon the straight portion 13 and adapted to revolve and slide thereon is a spherical bearing 15, which is countersunk, as at 16 in Fig. 3, to receive the head 14.

In assembling the parts of my improved support for curtains the spherical bearing 15 is preferably placed upon the straight portion 13 of the wire $8^a$ before the head 14 is secured to said wire, and the bearing 15 is passed into the bore 6 of the rod 5, the straight portion 13 operating within the groove 7. The end knobs are then secured in place by inserting the pins 10 in the ends of the bore 6, and the bearings 15 are then prevented from escape from the said bore.

In the use of my improved curtain-support the rod 5 is secured in position in the window or door frame or wherever it is desired to use the same, and the curtains are attached to the securing devices composed of the wire $8^a$ and any desired number of which devices may be employed. In connecting the curtains to said securing devices the clasps $9^a$ are passed through and connected therewith in the usual manner, and the hooks 11 are also passed through the curtains, and thus double securing means are provided. If preferred, either the hooks 11 or the clasps $9^a$ may be dispensed with and the curtain be suspended solely by the other. In using both of the latter, however, either the clasp $9^a$ or the hooks 11 may be used to support the main weight of the curtain, and the other device may be used to drape the curtain or loop it in any desired manner.

By using a single length of wire $8^a$ in the construction of the clasp $9^a$ and hooks 11 I am enabled to secure strength, lightness, and cheapness. The bearing 15 enables a suspended curtain to be easily manipulated, as said bearing readily travels within the bore 6.

It is evident that various changes may be made in the construction and operation of my improved curtain-support without departing from the spirit of my invention, and I claim all such as come within the scope thereof.

Having fully described my invention, I claim as new and desire to secure by Letters Patent—

1. In a curtain-support of the class described, a securing device composed of a single piece of bent wire, the ends of which are formed into a spring-clasp, said wire being doubled together above said clasp and again separated to form a pair of projecting hooks, substantially as shown and described.

2. In a curtain-support of the class described, a rod provided with a longitudinal bore, and a longitudinal groove communicating therewith, and a securing device composed of a single piece of wire, the ends of which are formed into a spring-clasp, said wire being doubled and twisted together above said clasp, and separated thereabove to form two projecting hooks, doubled and twisted together above said hooks and thence extended in a loop formed of straight parallel sides terminating in a head and a spherical bearing revolubly mounted upon said straight portion and provided with a countersunk portion in which said head is adapted to operate, said spherical bearing being adapted to operate within said bore, substantially as shown and described.

3. In a curtain-support of the class described, a securing device composed of a single piece of bent wire the ends of which are formed into a spring-clasp, said wire being bent above said clasp to form a pair of projecting hooks, and projected above said hooks in a parallel-sided loop provided at its end with a head or knob and a spherical body slidably mounted upon said loop and provided with a countersunk portion adapted to receive said head or knob, substantially as shown and described.

4. In a curtain-support of the class described, a securing device composed of a single piece of bent wire, the ends of which are formed into a spring-clasp, said wire being doubled together above said clasp, and again separated out to form a projecting hook and provided with a looped extension by means of which the entire device is suspended, substantially as shown and described.

In testimony that I claim the foregoing as my invention I have signed my name, in presence of the subscribing witnesses, this 5th day of July, 1899.

LOUIS F. BERGMAN.

Witnesses:
F. A. STEWART,
C. C. OLSEN.